(12) United States Patent
Krishnamurthy et al.

(10) Patent No.: US 10,824,435 B2
(45) Date of Patent: Nov. 3, 2020

(54) REGION TO HOST AFFINITY FOR BLOCK ALLOCATION IN CLUSTERED FILE SYSTEM VOLUME

(71) Applicant: VMWARE, INC., Palo Alto, CA (US)

(72) Inventors: Pradeep Krishnamurthy, Bangalore (IN); Srikanth Mahabalarao, Bangalore (IN); Prasanna Aithal, Bangalore (IN); Mahesh Hiregoudar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 51 days.

(21) Appl. No.: 16/283,854

(22) Filed: Feb. 25, 2019

(65) Prior Publication Data

US 2020/0192712 A1     Jun. 18, 2020

(30) Foreign Application Priority Data

Dec. 18, 2018  (IN) .............................. 201841047904

(51) Int. Cl.

| | |
|---|---|
| *G06F 9/46* | (2006.01) |
| *G06F 9/38* | (2018.01) |
| *G06F 9/50* | (2006.01) |
| *G06F 9/455* | (2018.01) |
| *G06F 16/182* | (2019.01) |
| *G06F 11/30* | (2006.01) |
| *G06F 16/188* | (2019.01) |

(Continued)

(52) U.S. Cl.
CPC ........ *G06F 9/3891* (2013.01); *G06F 9/45558* (2013.01); *G06F 9/5011* (2013.01); *G06F 9/5033* (2013.01); *G06F 9/5077* (2013.01); *G06F 11/3006* (2013.01); *G06F 11/3051* (2013.01); *G06F 16/182* (2019.01); *G06F 16/192* (2019.01); *G06F 3/064* (2013.01); *G06F 17/11* (2013.01); *G06F 21/6218* (2013.01); *H04L 47/70* (2013.01)

(58) Field of Classification Search
CPC ...... G06F 9/5077; G06F 9/5088; G06F 16/27; G06F 3/061; G06F 3/0604; G06F 9/45558; G06F 9/3891; G06F 9/5011; G06F 9/5033; G06F 3/064; G06F 11/3051; G06F 11/3006
See application file for complete search history.

(56) References Cited

U.S. PATENT DOCUMENTS 8,601,473 B1 * 12/2013 Aron ..................... G06F 9/5088
                                                  718/1
9,104,339 B1 *  8/2015 Kalekar ................. G06F 3/061
(Continued)

*Primary Examiner* — Tuan A Vu
(74) *Attorney, Agent, or Firm* — Su IP Consulting

(57) ABSTRACT

A method is provided for a computer to allocate a resource from a clustered file system (CFS) volume stored on one or more physical storage devices to a file. The CFS volume includes resources organized into resource clusters and the resource clusters make up regions. The method includes, for each region of resource clusters, determining a first count of resources allocated to the host computer and a second count of resources allocated to all other host computers, and calculating a region weight based on the first count and the second count. The method further includes sorting a list of the regions based on their region weights, selecting a region at or near the start of the list, and allocating the resource from a resource cluster in the selected region to the file.

15 Claims, 4 Drawing Sheets

(51) Int. Cl.
    *G06F 17/11*     (2006.01)
    *G06F 3/06*     (2006.01)
    *H04L 12/911*     (2013.01)
    *G06F 21/62*     (2013.01)

(56) References Cited

U.S. PATENT DOCUMENTS

| | | | |
|---|---|---|---|
| 2010/0186014 A1* | 7/2010 | Vaghani | G06F 3/0604 |
| | | | 718/101 |
| 2012/0296872 A1* | 11/2012 | Frost | G06F 16/27 |
| | | | 707/634 |
| 2016/0216991 A1* | 7/2016 | Ansari | G06F 9/5077 |
| 2018/0157522 A1* | 6/2018 | Bafna | G06F 9/45558 |

* cited by examiner

REGION TO HOST AFFINITY FOR BLOCK ALLOCATION IN CLUSTERED FILE SYSTEM VOLUME

CROSS-REFERENCE TO RELATED APPLICATION

Benefit is claimed under 35 U.S.C. 119(a)-(d) to Foreign Application Serial No. 201841047904 filed in India entitled "REGION TO HOST AFFINITY FOR BLOCK ALLOCATION IN CLUSTERED FILE SYSTEM VOLUME", on Dec. 18, 2018, by VMware, Inc., which is herein incorporated in its entirety by reference for all purposes.

BACKGROUND

Virtual machine file system (VMFS) from VMware, Inc. is a clustered file system (CFS) that provides storage virtualization optimized for virtual machines. Each virtual machine is encapsulated in a small set of files. VMFS is the default storage management interface for these files on physical small computer system interface (SCSI) disks and partitions. VMFS empowers information technology (IT) organizations to greatly simplify virtual machine provisioning by efficiently storing the entire machine state in a central location. It enables multiple instances of hypervisor host computers to access shared virtual machine storage concurrently.

DETAILED DESCRIPTION

Figure 1:
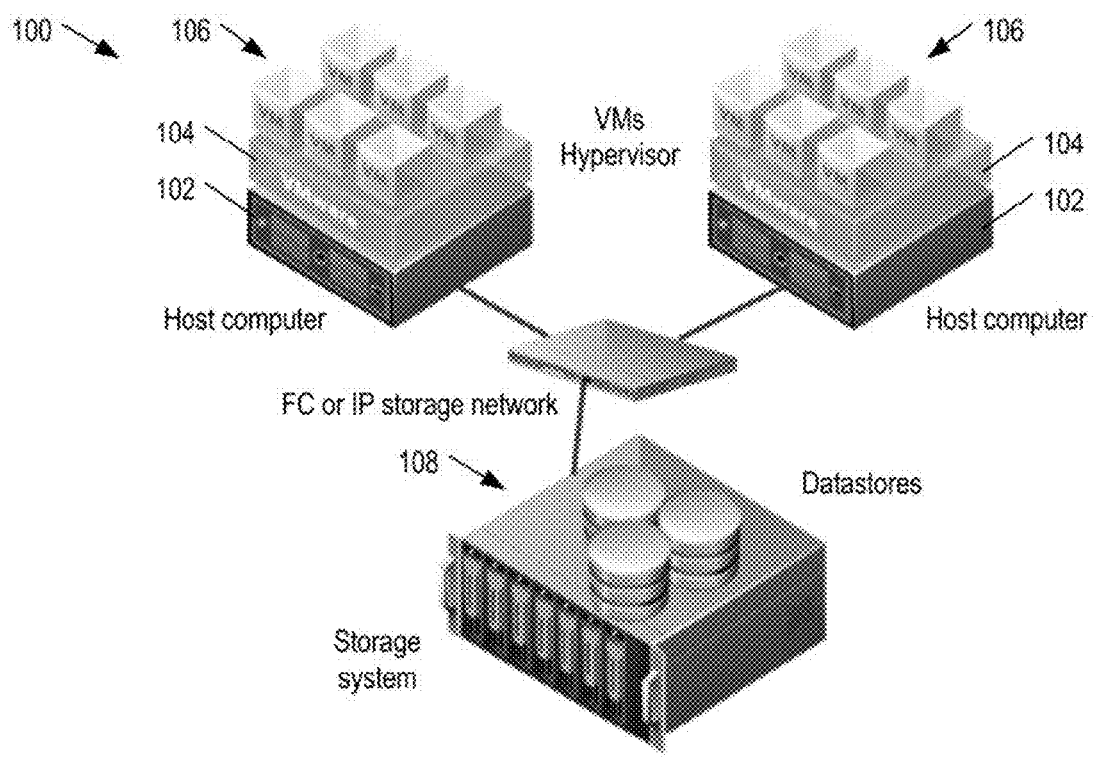
FIG. 1 is a block diagram illustrating a cluster of host computers running hypervisor in examples of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

FIG. 1 is a block diagram illustrating a cluster of host computers 102 running hypervisor 104 to create and run virtual machines 106 in examples of the present disclosure. Host computers 102 stores virtual machines 106 as files on file system volumes, also known as datastores, hosted on a shared storage system and accessed via a storage area network (SAN) 108. Virtual machine file system (VMFS) is the underlying file system volume for block-based storage systems that host computers 102 access. The cluster of host computers 102 is managed by a vCenter server (not shown), which may invoke operations that are contained in a single host computer (e.g., powering on a VM) or operations that span multiple host computers 102 or multiple storage devices.

Being a distributed file system, VMFS relies on on-disk locks to arbitrate access to shared storage among multiple ESX hosts. VMFS also uses an on-disk heartbeat mechanism to indicate liveness of hosts using the shared storage.

Figure 2:
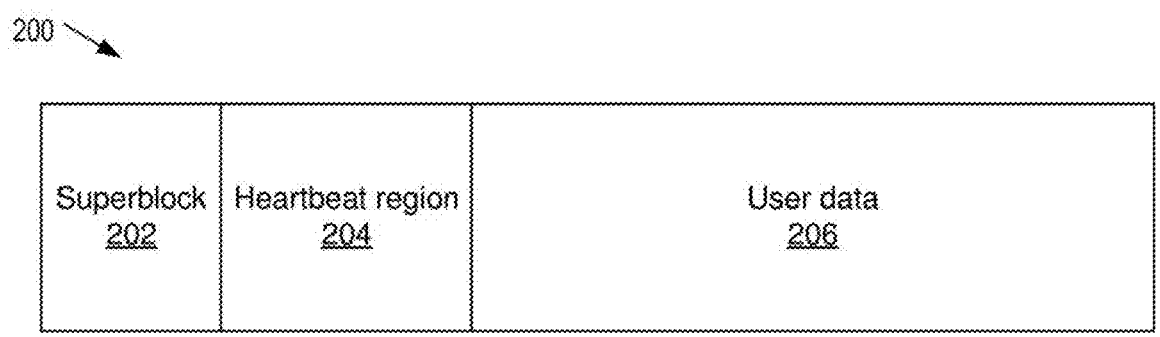
FIG. 2 is a block diagram illustrating a layout of a virtual machine file system (VMFS) volume in examples of the present disclosure.

FIG. 2 is a block diagram illustrating the layout of a VMFS volume 200 on a logical unit number (LUN) in examples of the present disclosure. VMFS volume 200 includes a superblock 202, a heartbeat region 204, and metadata/user data 206. Although not shown, paddings may be added between regions.

Superblock 202 stores the block size, the volume size, and the universal unique identifier (UUID) for VMFS volume 200.

Heartbeat region 204 is used for on-disk locking to ensure that distributed access to VMFS volume 200 occurs safely. Every host computer 102 has its own heartbeat (HB) slot in heartbeat region 204. Each host computer 102 periodically updates its HB slot. When a HB slot is not updated for a considerable time (e.g., >16 seconds), then the corresponding host computer 102 (FIG. 1) is assumed to be dead.

Metadata/user data 206 are stored in contiguously arranged storage units of equal size ("blocks") on the LUN, which are addressed by offsets from a base address. Metadata/user data 206 are organized into four (4) resource types: file descriptors (e.g., inodes), pointer blocks, sub-blocks, and file blocks. A file descriptor is a file metadata section and an address section. The file metadata section stores information such as the owner host computer, access permission, creation date, and modification date. The address section may directly store the file data (e.g., less than 1 KB) although it typically stores pointers to (1) sub-blocks (e.g., 64 KB), (2) file blocks, or (3) pointer blocks.

Sub-blocks are used by directories while file blocks are used by file data. A (primary) pointer block points to file blocks or (secondary) pointer blocks that point to file blocks. Pointer blocks are formed with sub-blocks.

A file block may be a small file block (SFB) or a large file block (LFB). SFBs (e.g., each 1 MB) are allocated as needed to a thin-provisioned file to store file data. LFBs (e.g., each 512 MB) are allocated upfront, as much as possible, to a thick-provisioned file to store file data. SFBs are allocated to any portion of the thick file that does not take up an entire LFB.

Figure 3:
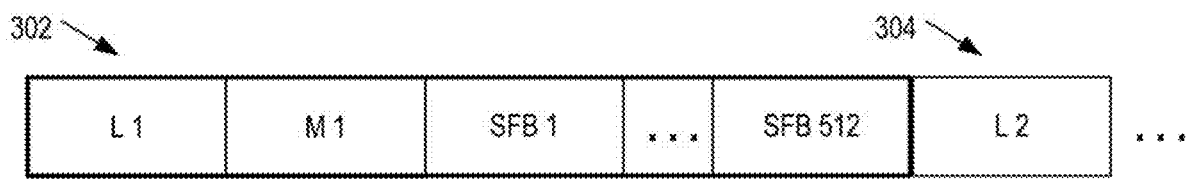
FIG. 3 is a block diagram illustrating a layout of a cluster of file blocks in the VMFS volume of FIG. 2 in some examples of the present disclosure.

FIG. 3 is a block diagram illustrating a layout of SFBs in metadata/user data 206 (FIG. 2) in some examples of the present disclosure. The SFBs are organized in clusters and each SFB cluster shares metadata for the SFB cluster and an on-disk lock governing the cluster metadata. For example, a SFB cluster 302 includes 512 SFBs, cluster metadata M 1 for SFB cluster 302, and an on-disk lock L 1 governing the cluster metadata M 1. Cluster metadata M1 stores the number of total SFBs, the number of free (unallocated) SFBs in SFB cluster 302 (e.g., a free count), the number of files assigned to SFB cluster 302 (e.g., an affinity count), and an allocation bitmap for SFB 1, SFB 2 . . . SFB 512. On-disk lock L 1 stores (1) a lock type that identifies the type of metadata this lock is protecting, (2) a lock mode that identifies whether a lock is free or whether it is locked in exclusive/read-only, etc. mode, (3) a lock owner that identifies the UUID of the host computer which currently owns the lock, (4) an allocation owner that identifies the UUID of the host computer that last allocated blocks from the cluster protected by this lock, and (5) a heartbeat address that identifies the HB slot of the lock owner. Note that when a host computer 102 unlocks an on-disk lock, it updates the allocation owner field with its own UUID if it allocated from a corresponding SFB cluster.

Assume a particular lock is needed by a host computer (e.g., host A), and that lock is currently not free (as per lock mode field) and locked by another host computer (e.g., host B). The HB address field enables host A to observe the HB slot of host B for a period of time to determine if host B is alive or not. If host A determines that host B is not alive (as the HB slot for host B has not changed for up to 16 seconds), then host A can "clear" host B's HB slot and break the lock it wants and go ahead with its operation.

SFB cluster 302 may be followed by other SFB clusters having the same layout, including a SFB cluster 304 (represented by its on-disk lock L 2).

LFBs has the same layout as SFBs but the LFB clusters may have a different number of file blocks. For example, a LFB cluster holds sixteen (16) LFBs.

Figure 4:
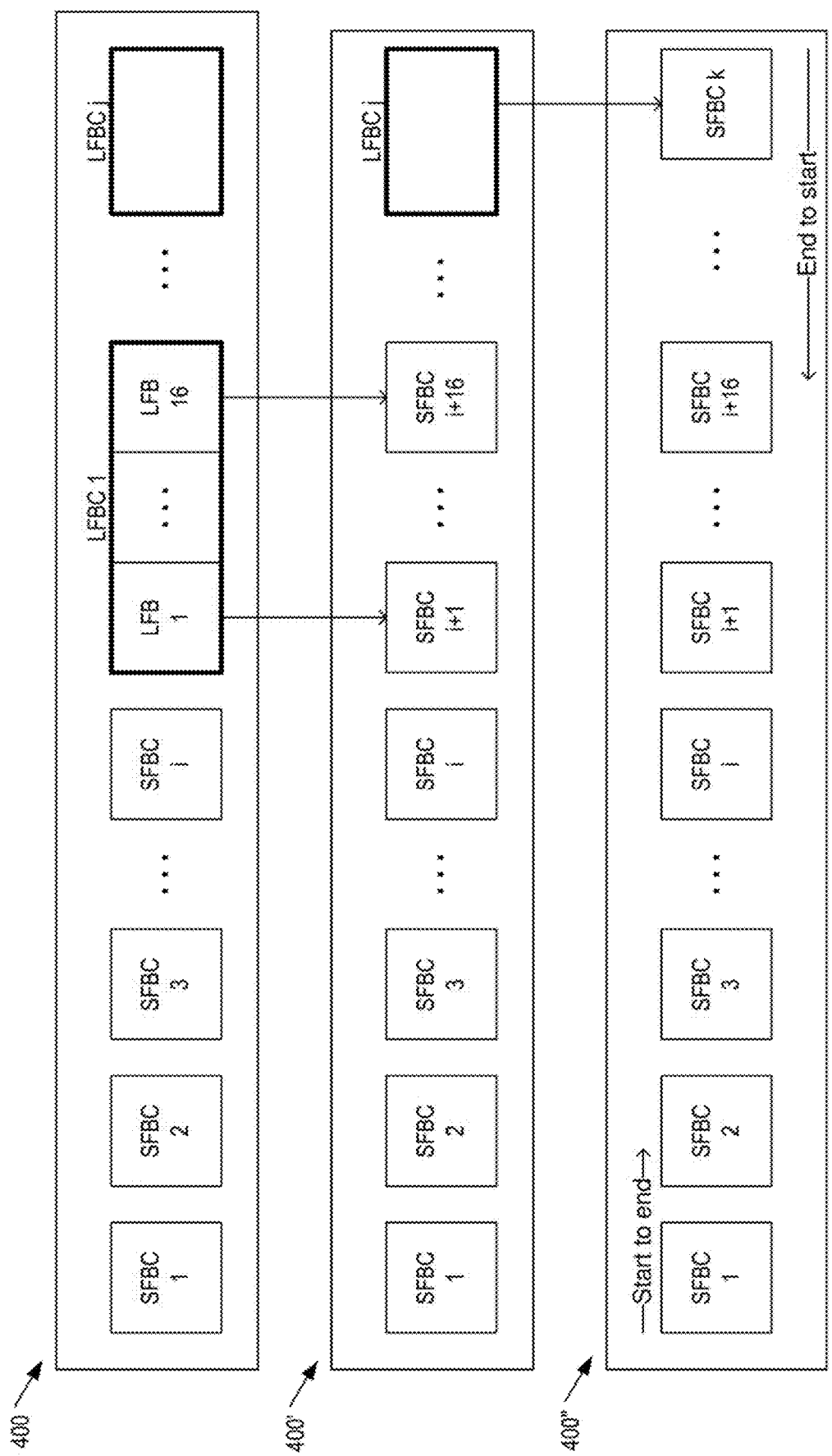
FIG. 4 is a block diagram illustrating arrangements of file blocks in the VMFS volume of FIG. 2 in examples of the present disclosure.

Metadata/user data 206 has an initial number of SFB clusters (SFBCs) and an initial number of LFB clusters (LFBCs). FIG. 4 is a block diagram illustrating an initial arrangement 400 of the SFB clusters and the LFB clusters in some examples of the present disclosure. To reduce lock contention between host computers that share VMFS volume 200, host computers 102 (FIG. 1) utilize a block allocation mechanism to allocate free SFBs to their thin files. Implementing the block allocation mechanism, a host computer 102 scans the SFB clusters in one direction (e.g., from start to end or left to right in FIG. 4) for the first SFB cluster that does not have any thin file consuming its SFBs (e.g., an affinity count=0) and then allocates a SFB from the cluster to its thin file. This avoids multiple host computers 102 contending for SFBs in the same SFB cluster even if a VM is moved to a different host computer 102 from where its thin file was created since each SFB cluster is only used by a single thin file. For this process, host computer 102 tracks the affinity count of the SFB clusters in memory, which is the number of files allocated from a SFB cluster.

When all the SFB clusters have thin files consuming their SFBs (all having affinity count=1), host computer 102 converts a completely free LFB cluster to SFB clusters as shown in a second arrangement 400'. As previously described, in some examples, SFB is 1 MB, SFB cluster is 512 MB (because it holds 512 SFBs), LFB is 512 MB (same size as SFB cluster), and LFB cluster holds sixteen (16) LFBs. Thus, one LFB cluster converts to sixteen (16) SFB clusters. For example, a LFB cluster 1 is converted to SFB clusters i to i+16.

In some instances, all the LFB clusters have been converted so only SFB clusters remain. This is shown in a third arrangement 400" with SFB clusters 1 to k. When all the SFB clusters have thin files consuming their SFBs and all the LFB clusters have been converted to SFB clusters, host computer 102 scans the SFB clusters in the reverse direction (e.g., from end to start or right to left in FIG. 4) for the first SFB cluster that has free SFBs (e.g., free count>0) and then allocates a free (unallocated) SFB from that cluster to its thin file. To implement this process, host computer 102 tracks the free count for the SFB clusters in memory, which is the number of free SFBs in a SFB cluster.

The above-described block allocation mechanism of VMFS has certain short comings.

1. When scanning in the reserve direction, all the host computers 102 end up allocating from the same SFB clusters at or near the end of VMFS volume 200. This is because all the host computers 102 select the very first SFB cluster that has free SFBs (e.g., free count>0). In other words, a host computer 102 does not consider how many files from other host computers 102 are also allocated from a SFB cluster (e.g., affinity count) when scanning in the reverse direction.

2. The number of reads issued during block allocation can be large as host computers 102 start their scan of cluster metadata from the same starting position. For example, when scanning for free SFB clusters in the reverse direction, all the host computers 102 start from the end of VMFS volume 200. As VMFS volume fills, every single allocation would read the cluster metadata of those SFB clusters that are already allocated to check for free SFB clusters. Even if a host computer 102 remembers the last SFB cluster that it allocated from, multiple files may still assign to same SFB cluster if the block allocation mechanism relies only on the free count without considering the affinity count.

3. Each host computer 102 maintains hints such as affinity count and free count in memory to assist block allocation. However, the hints do not provide a global view of how space is allocated and distributed among all the host computers 102.

4. Many contentions occur when LFB clusters are converted to SBC clusters. After a LFB-to-SBC cluster conversion, all the host computers 102 try to allocate from the new SFB clusters that are close together even when less-used SFB clusters are available elsewhere in VMFS volume 200.

In summary, due to lack of a global view, input/output (IO) latency increases as host computers 102 contending for the same SFB cluster must wait to obtain the on-disk lock on the cluster when another host computer 102 is not releasing the lock for any reason.

Figure 5:
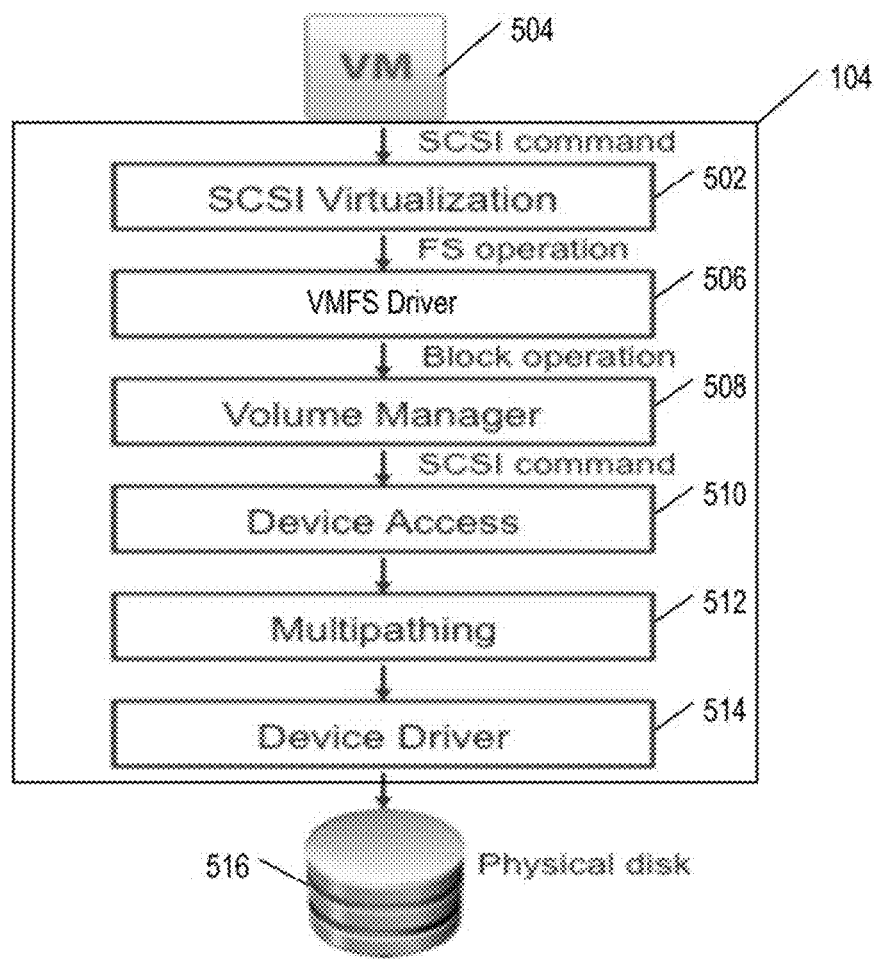
FIG. 5 is a block diagram illustrating a virtual machine input/output (VM I/O) path through a hypervisor of FIG. 1 in examples of the present disclosure.

FIG. 5 is a block diagram illustrating a VM I/O path through hypervisor 104 in examples of the present disclosure. Hypervisor 104 emulates a small computer system interface (SCSI) host bus adapter and populates it with virtual SCSI disks, which are blobs exported by a SCSI virtualization layer 502. The guest operating system on a VM 504 issues SCSI commands to the virtual SCSI disks, and SCSI virtualization layer 502 converts the SCSI commands into file system operations. A VMFS driver 506 remaps the SCSI device offsets (file offsets) into VMFS volume offsets and forwards the request as block operations to a volume manager 508. Volume manager 508 aggregates one or more physical storage devices into a VMFS volume. Volume manager 508 remaps VMFS volume offsets to physical device offsets and forward the request as SCSI commands to a device access layer 510. Device access layer 510 supports multipath consolidation and other data access control and management functions for disk 516. Multipathing layer 512 handles multiple paths to disk 516. Device driver 514 formats the SCSI commands into a protocol-compliant format for disk 516.

Figure 6:
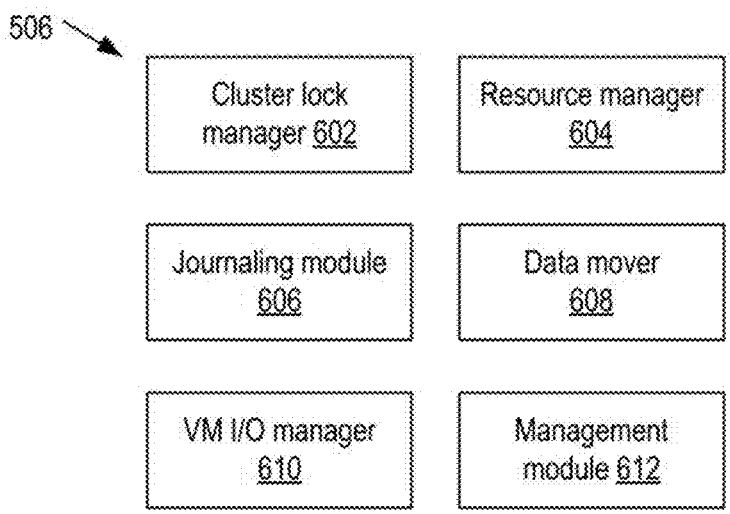
FIG. 6 is a block diagram illustrating a VMFS driver of the hypervisor of FIG. 5 in examples of the present disclosure.

FIG. 6 is a block diagram illustrating VMFS driver 506 in examples of the present disclosure. VMFS driver 506 includes a cluster lock manager 602 for managing on-disk locks, a resource manager 604 for allocating blocks, a journaling module 606 to execute redo transactions, a data mover 608 for bulk data movement, a VM I/O manager 610 for queuing I/Os and handling errors, and a management module 612 to service VM management operations from a central management server (e.g., vCenter server).

Figure 7:
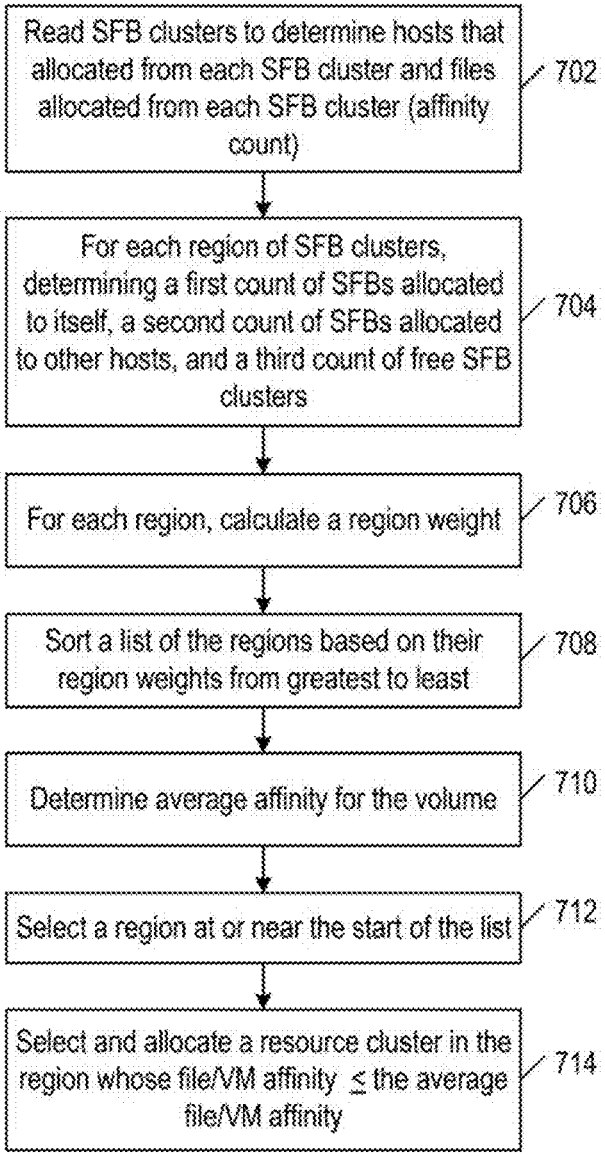
FIG. 7 is a block diagram illustrating a flowchart of a method for the resource manager of the VMFS driver of FIG. 6 to allocate a file block from VMFS volume of FIG. 2 in examples of the present disclosure.

FIG. 7 is a block diagram illustrating a flowchart of a method 700 for resource manager 604 (FIG. 6) to allocate a SFB to a thin file from a clustered file system (e.g., VMFS volume 200 in FIG. 2) in examples of the present disclosure. Method 700, and any method described herein, may be implemented as instructions encoded on a computer-readable medium that is to be executed by a processor in a computer system. Method 700, and any method described herein, may include one or more operations, functions, or actions illustrated by one or more blocks. Although the blocks are illustrated in sequential orders, these blocks may also be performed in parallel, and/or in a different order than those described herein. In addition, the various blocks may be combined into fewer blocks, divided into additional blocks, and/or eliminated based upon the desired implementation. Method 700 may begin in block 702.

In block 702, resource manager 604 on a host computer 102 (FIG. 1) reads on-disk locks and cluster metadata of resource clusters, such as SFB clusters, in VMFS volume 200 to determine host computers 102 that allocated from each of the SFB clusters and a number of files allocated from each of the SFB clusters (e.g., an affinity count for each SFB cluster). As described earlier, each on-disk lock records the UUID of a host computer 102 that last allocated from a particular SFB cluster. Block 702 may be followed by block 704.

Figure 8:
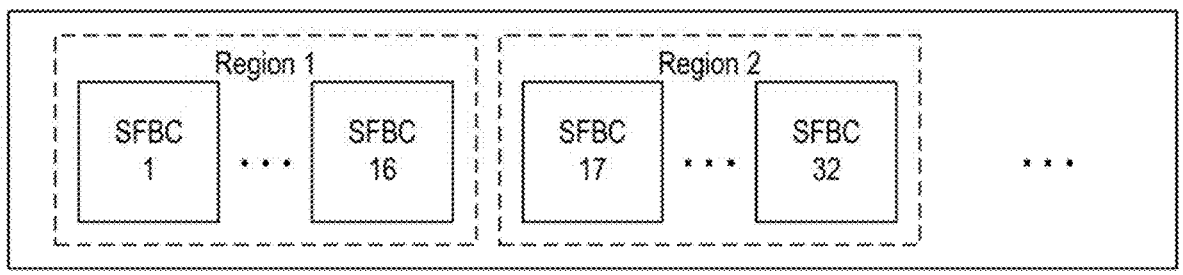
FIG. 8 is a block diagram illustrating file blocks make up a region in examples of the present disclosure.

In block 704, for each "region" of SFB clusters, resource manager 604 on host computer 102 determines a first count of SFB clusters that the host computer 102 has allocated from, a second count of SFB clusters other host computers 102 have allocated from, and a third count of free SFB clusters. As shown in FIG. 8, every sixteen (16) SFB clusters make up a region in some examples of the present disclosure. Referring back to FIG. 7, block 704 may be followed by block 706.

In block 706, resource manager 604 on host computer 102 calculates a region weight based on the first count and the second count. The region weight is calculated as follows:

$$regionWeight = A*totalResources + myAllocCount - B*otherAllocCount,$$

where "totalResources" is the number of SFB clusters in each region of SFB clusters (e.g., 16), "myAllocCount" is the first count (e.g., ranges from 0 to 16), and "otherAllocCount" is the second count (e.g., ranges from 0 to 16). "B" is a magnifying constant greater than 0, which is used to deprioritize regions that other host computers 102 (i.e., magnify the effect of allocation to others) have allocated from. "A" is a multiplier to make "regionWeight" greater than 0. For example, A and B are both set to 6.

Block 706 may be followed by block 708.

In block 708, resource manager 604 on host computer 102 sorts a list of the regions based on their region weights. The list starts from the greatest region weight to the least region weight. Resource manager 604 de-prioritizes any region that is full (i.e., has no free clusters/blocks) so such region would be selected last if no other regions with free SFB clusters are available. For the same SFB cluster, each host computer 102 sees a different region weight due to the way the region weight is based on the difference between each host computer's myAllocCount and otherAllocCount. Block 708 may be followed by block 710.

In block 710, resource manager 604 on host computer 102 calculates an average affinity count for VMFS volume 200 by summing all the affinity counts of the SFB clusters (determined in block 702) and dividing the sum by the number of SFB clusters. Block 710 may be followed by block 712.

In block 712, resource manager 604 on host computer 102 selects a region at the start of the list when the top regions at the start of the list have different region weights. When the top regions have the same region weight, resource manager 604 may shuffle them to ensure the same region is not selected by multiple host computers 102. Block 712 may be followed by block 714.

In block 714, resource manager 604 selects a SFB cluster in the selected region that has an affinity count less than or equal to the average affinity count of VMFS volume 200 and allocates a SFB from the selected SFB cluster to the thin file. When two SFB clusters have the same affinity count, resource manager 604 may select the SFB cluster with the higher free count (the third count determined in block 704). Selecting such a SFB cluster ensures the even distribution of files across all the SFB clusters, which in turn reduces contentions for the same SFB cluster. Once allocated, the file descriptor (inode) and pointer blocks for the thin file are updated (written) with the address of the newly allocated SFB cluster. Block 714 may end method 700.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method, performed by a host computer having a processor, to allocate a resource from a clustered file system (CFS) volume stored on one or more physical storage devices to a file, the CFS volume comprising resources organized into resource clusters, and the resource clusters make up regions, the method comprising:

for each region of the resource clusters:
determining a first count of resources allocated to the host computer and a second count of resources allocated to all other host computers; and
calculating a region weight based on the first count and the second count;

sorting a list of the regions based on their region weights that starts from the greatest region weight to the least region weight;

selecting a region at or near the start of the list; and allocating the resource from a resource cluster in the selected region to the file.

2. The method of claim 1, wherein the region weight is based on magnifying the second count and determining a difference between the first count and the magnified second count.

3. The method of claim 1, wherein:
the region weight is calculated based on
generating a first product by multiplying a number of resource clusters in each region with a multiplier factor,
generating a first sum by adding to the first product to the first count of resources allocated to the host computer, generating a second product by multiplying the second count of resources allocated to other host computers with a magnifier factor, and subtracting the second sum from the first sum.

4. The method of claim 1, further comprising selecting the resource cluster in the selected region to evenly distribute files in all the resource clusters.

5. The method of claim 4, wherein selecting the resource cluster comprises:

for each resource cluster, determining an affinity count of files allocated from the resource cluster;

determining an average affinity count of files allocated from all the resource clusters in the CFS volume; and selecting the resource cluster in the region whose affinity count is less than or equal to the average affinity count.

6. A non-transitory, computer-readable storage medium encoded with instructions executable by a processor to implement a hypervisor on a host computer, to allocate a resource from a clustered file system (CFS) volume stored on one or more physical storage devices to a file, the CFS volume comprising resources organized into resource clusters, and the resource clusters make up regions, the instructions comprising:

for each region of the resource clusters:

determining a first count of resources allocated to the host computer and a second count of resources allocated to all other host computers; and calculating a region weight based on the first count and the second count;

sorting a list of the regions based on their region weights that starts from the greatest region weight to the least region weight;

selecting a region at or near the start of the list; and allocating the resource from a resource cluster in the selected region to the file.

7. The non-transitory, computer-readable storage medium of claim 6, wherein the region weight is based on magnifying the second count and determining a difference between the first count and the magnified second count.

8. The non-transitory, computer-readable storage medium of claim 7, wherein:

the region weight is calculated based on generating a first product by multiplying a number of resource clusters in each region with a multiplier factor, generating a first sum by adding to the first product to the first count of resources allocated to the host computer, generating a second product by multiplying the second count of resources allocated to other host computers with a magnifier factor, and subtracting the second sum from the first sum.

9. The non-transitory, computer-readable storage medium of claim 7, wherein the instructions further comprise selecting the resource cluster in the selected region to evenly distribute files in all the resource clusters.

10. The non-transitory, computer-readable storage medium of claim 9, wherein selecting the resource cluster comprises:

for each resource cluster, determining an affinity count of files allocated from the resource cluster;

determining an average affinity count of files allocated from all the resource clusters in the CFS volume; and selecting the resource cluster in the region whose affinity count is less than or equal to the average affinity count.

11. A computer having a processor to allocate a resource from a clustered file system (CFS) volume stored on one or more physical storage devices to a file, the CFS volume comprising resources organized into resource clusters, and the resource clusters make up regions, wherein the computer is configured to:

for each region of the resource clusters:

determine a first count of resources allocated to the computer and a second count of resources allocated to all other computers; and calculate a region weight based on the first count and the second count;

sort a list of the regions based on their region weights that starts from the greatest region weight to the least region weight;

select a region at or near the start of the list; and allocate the resource from a resource cluster in the selected region to the file.

12. The computer of claim 11, wherein the region weight is based on magnifying the second count and determining a difference between the first count and the magnified second count.

13. The computer of claim 12, wherein:

the region weight is calculated based on generating a first product by multiplying a number of resource clusters in each region with a multiplier factor, and generating a first sum adding to the first product to the first count of resources allocated to the computer, generating a second product by multiplying the second count of resources allocated to other computers with a magnifier factor, and subtracting the second sum from the first sum.

14. The computer of claim 11, wherein the computer is further configured to select the resource cluster in the selected region to evenly distribute files in all the resource clusters.

15. The computer of claim 14, wherein the computer selects the resource cluster by:

for each resource cluster, determine an affinity count of files allocated from the resource cluster;

determine an average affinity count of files allocated from all the resource clusters in the CFS volume; and select the resource cluster in the region whose affinity count is less than or equal to the average affinity count.

* * * * *